United States Patent
Han et al.

(10) Patent No.: US 9,560,144 B2
(45) Date of Patent: Jan. 31, 2017

(54) APPARATUS AND METHOD FOR PROCESSING PACKETS

(71) Applicant: ELECTRONICS AND TELECOMMUNICATIONS RESEARCH INSTITUTE, Daejeon (KR)

(72) Inventors: YuJeong Han, Daejeon (KR); Dong Su Nam, Daejeon (KR); HyungGeun Oh, Daejeon (KR); Kiwook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 133 days.

(21) Appl. No.: 14/471,816

(22) Filed: Aug. 28, 2014

(65) Prior Publication Data

US 2015/0222689 A1     Aug. 6, 2015

(30) Foreign Application Priority Data

Feb. 4, 2014    (KR) .................. 10-2014-0012641

(51) Int. Cl.
| | | |
|---|---|---|
| *G06F 15/16* | (2006.01) | |
| *H04L 29/08* | (2006.01) | |
| *H04L 29/06* | (2006.01) | |

(52) U.S. Cl.
CPC ............ *H04L 67/146* (2013.01); *H04L 63/14* (2013.01)

(58) Field of Classification Search
CPC ......... H04L 29/08; H04L 67/146; H04L 63/14
USPC ........................................................ 709/217
See application file for complete search history.

(56) References Cited

U.S. PATENT DOCUMENTS

| | | | |
|---|---|---|---|
| 2006/0195545 A1 | 8/2006 | Kikkawa et al. | |
| 2010/0046391 A1* | 2/2010 | Moore ................ | H04L 12/2602 370/252 |
| 2010/0199276 A1* | 8/2010 | Umbehocker ........ | G06F 3/0604 718/1 |
| 2012/0167221 A1 | 6/2012 | Kang et al. | |
| 2014/0219283 A1 | 8/2014 | Park et al. | |

FOREIGN PATENT DOCUMENTS

| | | |
|---|---|---|
| KR | 10-2005-0109511 A | 11/2005 |
| KR | 10-2009-0010265 A | 1/2009 |
| KR | 10-1056617 B1 | 8/2011 |
| KR | 10-2012-0071122 A | 6/2012 |
| KR | 10-2013-0135954 A | 12/2013 |
| KR | 10-2013-0140192 A | 12/2013 |
| KR | 10-2013-0038975 A | 8/2014 |

* cited by examiner

*Primary Examiner* — Tauqir Hussain
(74) *Attorney, Agent, or Firm* — LRK Patent Law Firm (57) ABSTRACT

An apparatus and method for processing packets are disclosed. The apparatus for processing packets includes a session processing unit, a parallel processing unit, and a storage unit. The session processing unit divides a packet group, including a plurality of HTTP packets, into a plurality of session files, and then distributes the session files. The parallel processing unit generates metadata and extracts content from each of the distributed session files based on the plurality of session files. The storage unit stores the metadata generated by the parallel processing unit and the content extracted by the parallel processing unit.

19 Claims, 6 Drawing Sheets

APPARATUS AND METHOD FOR PROCESSING PACKETS

CROSS-REFERENCE TO RELATED APPLICATION

This application claims the benefit of Korean Patent Application No. 10-2014-0012641, filed Feb. 4, 2014, which is hereby incorporated by reference in its entirety into this application.

BACKGROUND OF THE INVENTION

1. Technical Field

The present invention relates to an apparatus and method for processing packets.

2. Description of the Related Art

An apparatus for processing packets is used to monitor malicious actions, such as the propagation of malware or a malicious uniform resource locator (URL). Conventional apparatuses for processing packets, such as Wireshark, TCPDUMP, Network Minor and Kraken, basically provide session information regarding collected network packets.

Network Minor and Kraken provide the function of extracting content with respect to each application, such as FTP, SMTP, POP or HTTP.

In the conventional apparatuses for processing packets, however, the size of a packet group that can be processed at once is limited. In particular, the conventional apparatuses for processing packets do not support the processing of a packet group having a size equal to or larger than 10 Gigabytes. With an increase in the amount of use of the Internet and with the improvement of network performance, there are many cases where a network packet group having a size equal to or larger than 10 Gigabytes is collected per day.

Accordingly, there is a need for an apparatus and method for processing packets, which are capable of supporting the function of processing a large-sized packet group.

As a related technology, Korean Patent Application Publication No. 10-2013-0038975 discloses a method and apparatus for classifying packets.

SUMMARY OF THE INVENTION

Accordingly, the present invention has been made keeping in mind the above problems occurring in the conventional art, and an object of the present invention is to provide an apparatus and method that are capable of processing a large-sized packet group.

In accordance with an aspect of the present invention, there is provided an apparatus for processing packets, including a session processing unit configured to divide a packet group, including a plurality of HTTP packets, into a plurality of session files, and to distribute the session files; a parallel processing unit configured to generate metadata and extract content from each of the distributed session files based on the plurality of session files; and a storage unit configured to store the metadata generated by the parallel processing unit and the content extracted by the parallel processing unit.

The parallel processing unit may include a plurality of protocol analysis units; and each of the protocol analysis units may independently generate the metadata and extract the content from each of the session files.

Each of the protocol analysis units may include a request and response pair classification unit configured to classify the session files into HTTP request and response pairs, each including an HTTP request packet and an HTTP response packet; a metadata generation unit configured to generate metadata based on information about a Uniform Resource Locator (URL), Internet Protocol (IP) address, or domain of each of the HTTP request and response pairs; a webmail processing unit configured to analyze a mail protocol of the HTTP response packet or the HTTP request packet, and to extract e-mail content if the HTTP request and response pair corresponds to a webmail; and an HTTP packet processing unit configured to extract content related to a video, an image or a specific file based on the HTTP response packet if the HTTP request and response pair corresponds to a common HTTP message, not a webmail.

The e-mail content may include information about the sender, recipient or content of an e-mail.

The parallel processing unit may further comprise a plurality of virtual machines; and each of the protocol analysis units may operate based on each of the virtual machines.

The parallel processing unit may further include a plurality of central processing units (CPUs); and each of the protocol analysis units may operate based on each of the CPUs.

The storage unit may include a metadata storage unit configured to store the metadata generated by the metadata generation unit; and a content storage unit configured to store the e-mail content extracted by the webmail processing unit or the content related to a video, an image or a specific file extracted by the HTTP packet processing unit.

The session processing unit further may include a session division unit configured to divide the packet group into the session files based on packets having identical session information about a source IP address, a destination IP address, a source port and a destination port; and a session distribution unit configured to distribute the session files to the parallel processing unit.

The packet group may have a size equal to or larger than 10 Gigabytes.

The apparatus may further include an output unit configured to display the metadata, the content, results of the extraction of the metadata, or results of the extraction of the content on a screen.

In accordance with an aspect of the present invention, there is provided a method of processing packets, including dividing, by a session processing unit, a packet group including a plurality of HTTP packets into a plurality of session files, and distributing, by the session processing unit, the session files; generating, by a parallel processing unit, metadata and extracting, by the parallel processing unit, content from each of the distributed session files based on the plurality of session files; and storing, by a storage unit, the metadata generated by the parallel processing unit and the content extracted by the parallel processing unit.

The parallel processing unit may include a plurality of protocol analysis units; and each of the protocol analysis units may independently generate the metadata and extracts the content from each of the session files.

Each of the protocol analysis units may include a request and response pair classification unit configured to classify the session files into HTTP request and response pairs, each including an HTTP request packet and an HTTP response packet; a metadata generation unit configured to generate metadata based on information about a URL, IP address or domain of each of the HTTP request and response pairs; a webmail processing unit configured to analyze a mail protocol of the HTTP response packet or HTTP request packet, and to extract e-mail content if the HTTP request and response pair corresponds to a webmail; and an HTTP packet processing unit configured to extract content related to a video, an image, or a specific file based on the HTTP response packet if the HTTP request and response pair corresponds to a common HTTP message, not a webmail.

The e-mail content may include information about a sender, recipient or content of an e-mail.

The parallel processing unit may further include a plurality of virtual machines; and each of the protocol analysis units may operate based on each of the virtual machines.

The parallel processing unit may further include a plurality of central processing units (CPUs); and each of the protocol analysis units may operate based on each of the CPUs.

The storage unit may include a metadata storage unit configured to store the metadata generated by the metadata generation unit; and a content storage unit configured to store the e-mail content extracted by the webmail processing unit or the content related to a video, an image or a specific file extracted by the HTTP packet processing unit.

The session processing unit may include a session division unit configured to divide the packet group into the session files based on packets having identical session information about a source IP address, a destination IP address, a source port and a destination port; and a session distribution unit configured to distribute the session files to the parallel processing unit.

The packet group may have a size equal to or larger than 10 Gigabytes.

The method may further include displaying the metadata, the content, results of the extraction of the metadata, or results of the extraction of the content on a screen.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention are described with reference to the accompanying drawings in order to describe the present invention in detail so that those having ordinary knowledge in the technical field to which the present invention pertains can easily practice the present invention. The present invention may be implemented in various different ways, and are not limited to the disclosed embodiments. In order to clearly describe the present invention, descriptions unrelated to the description of the present invention are omitted, and the same reference numbers are used throughout the specification to designate the same or like components.

Throughout the specification and the claims, unless explicitly described to the contrary, the terms "include" and "comprise" and their variants, such as "includes," "including," "comprises," and "comprising", will be understood to imply the inclusion of stated components, not the exclusion of any other components.

Throughout the specification and the claims, when one component is described as being "connected" to another component, the one component may be "directly connected" to the other component or "electrically connected" to the other component via a third component.

An apparatus and method for processing packets according to embodiments of the present invention are described in detail with reference to the accompanying drawings.

Figure 1:
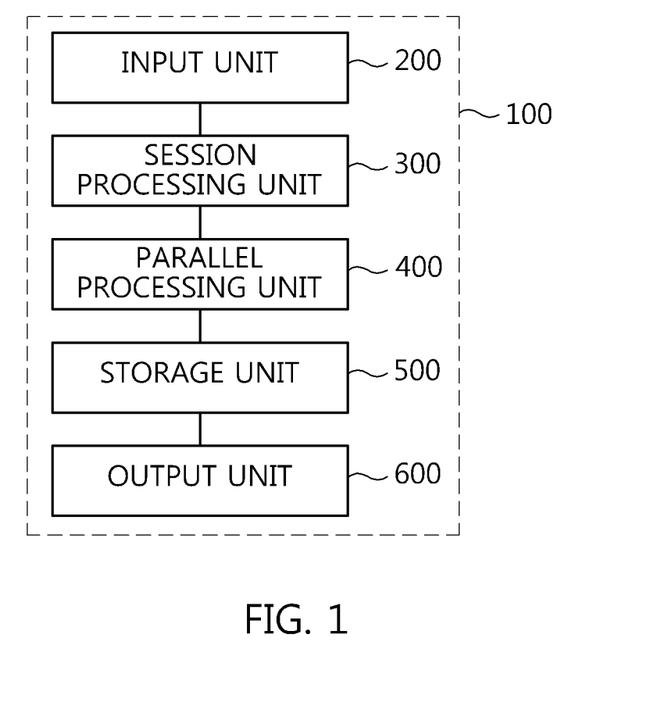
FIG. 1 is a block diagram illustrating an apparatus for processing packets according to an embodiment of the present invention.

FIG. 1 is a block diagram illustrating an apparatus 100 for processing packets according to an embodiment of the present invention.

The apparatus 100 for processing packets according to this embodiment of the present invention is described below with reference to FIG. 1.

The apparatus 100 for processing packets according to this embodiment of the present invention includes an input unit 200, a session processing unit 300, a parallel processing unit 400, a storage unit 500, and an output unit 600. Since the components of FIG. 1 are not essential, the apparatus 100 for processing packets may be implemented to include more or fewer components than the components of FIG. 1.

The components of the apparatus 100 for processing packets are described below.

The input unit 200 according to this embodiment of the present invention receives a plurality of packets, and forms a packet group. The size of the packet group according to this embodiment of the present invention may be equal to or larger than 10 Gigabytes. The input unit 200 according to an embodiment of the present invention may receive a plurality of HTTP packets, and may form a packet group.

The session processing unit 300 according to this embodiment of the present invention divides a received packet group into session files. Furthermore, the session processing unit 300 distributes the session files.

The configuration of the session processing unit 300 according to an embodiment of the present invention is described below with reference to FIG. 2.

Figure 2:
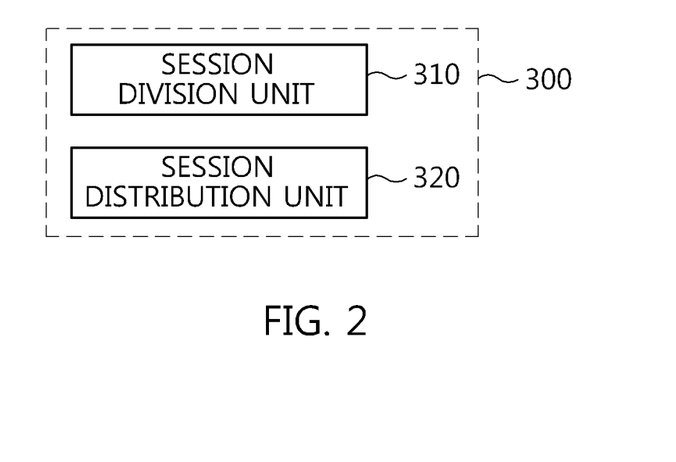
FIG. 2 is a block diagram illustrating a session processing unit according to an embodiment of the present invention.

FIG. 2 is a block diagram illustrating the session processing unit 300 according to this embodiment of the present invention.

The session processing unit 300 according to this embodiment of the present invention includes a session division unit 310, and a session distribution unit 320. Although the components of FIG. 2 are not essential, the session processing unit 300 may be implemented to include more or fewer components than the components of FIG. 1.

The session division unit 310 divides a packet group into session files based on session information. The session information according to an embodiment of the present invention may be a 4-tuple. The 4-tuple according to this embodiment of the present invention may include a source Internet Protocol (IP) address, a destination IP address, a source port and a destination port. That is, the session division unit 310 divides a packet group into session files based on packets having the same source IP address, destination IP address, source port and destination port.

A session file according to an embodiment of the present invention may be a group of packets that have the same source IP address, destination IP address, source port, and destination port.

The session distribution unit 320 distributes session files to the parallel processing unit 400. The session distribution unit 320 according to an embodiment of the present invention distributes session files to the virtual machines 410 or central processing units (CPUs) 420 of the parallel processing unit 400. The session distribution unit 320 may distribute session files to the virtual machines 410 or CPUs 420 of the parallel processing unit 400 in compliance with a predetermined rule. Furthermore, if session files converge onto a specific virtual machine 410 or CPU 420, the session distribution unit 320 may distribute session files to another virtual machine 410 or the CPU 420. Furthermore, the session distribution unit 320 according to an embodiment of the present invention may distribute session files to a plurality of protocol analysis units 430.

The parallel processing unit 400 according to an embodiment of the present invention includes the plurality of virtual machines 410 or the plurality of CPUs 420. The parallel processing unit 400 extracts metadata and content from each of the session files. Furthermore, the parallel processing unit 400 according to an embodiment of the present invention extracts metadata and content from each of distributed session files based on a plurality of session files. The parallel processing unit 400 according to an embodiment of the present invention processes received session files in parallel. The apparatus 100 for processing packets according to an embodiment of the present invention processes a packet group in parallel in terms of hardware using the parallel processing unit 400.

The configuration and operation of the parallel processing unit 400 are described in detail later.

The storage unit 500 according to an embodiment of the present invention stores metadata or content. The storage unit 500 according to an embodiment of the present invention stores metadata or content generated or extracted by the parallel processing unit 400.

Figure 3:
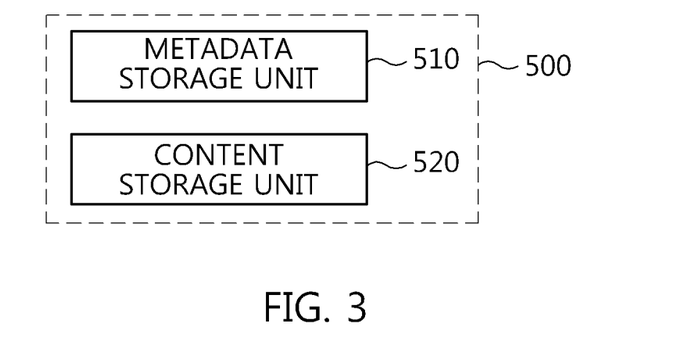
FIG. 3 is a block diagram illustrating a storage unit according to an embodiment of the present invention.

FIG. 3 is a block diagram illustrating the storage unit 500 according to an embodiment of the present invention.

The storage unit 500 includes a metadata storage unit 510, and a content storage unit 520.

The metadata storage unit 510 stores metadata extracted by the parallel processing unit 400.

The content storage unit 520 stores content extracted by the parallel processing unit 400. Content extracted by the parallel processing unit 400 may include content related to a video, an image or a specific file. Furthermore, content extracted by the parallel processing unit 400 may be e-mail content.

The output unit 600 according to an embodiment of the present invention may output the results of the extraction of metadata or content from a session file, which is performed by the parallel processing unit 400. Furthermore, the output unit 600 may output metadata or content stored in the storage unit 500.

The output unit 600 may display metadata, content, the results of the extraction of metadata or the results of the extraction of content on a screen in an image or text form.

The parallel processing unit 400 according to an embodiment of the present invention is described below with reference to FIGS. 4 and 6.

Figure 4:
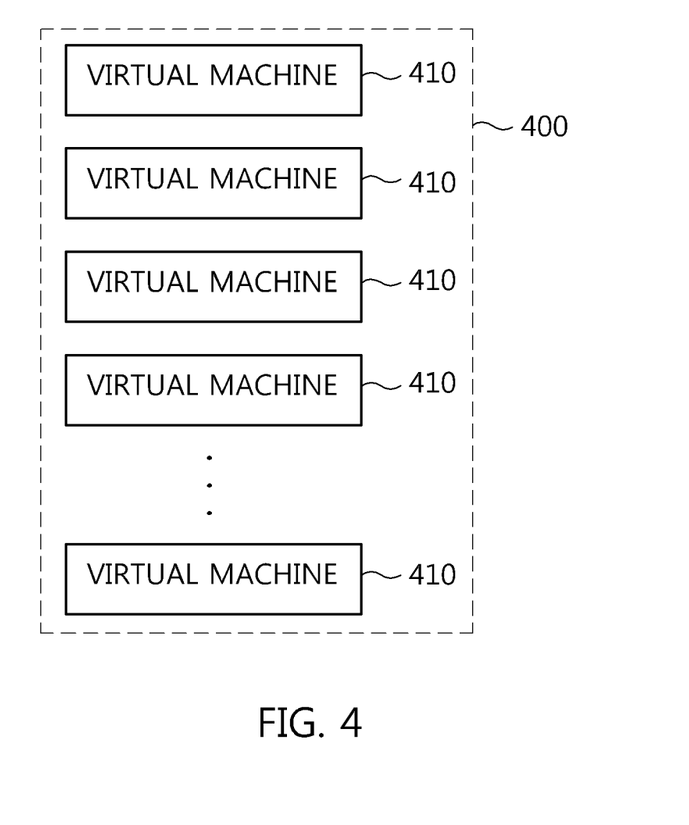
FIG. 4 is a block diagram illustrating a parallel processing unit according to an embodiment of the present invention.

FIG. 4 is a block diagram illustrating the parallel processing unit 400 according to an embodiment of the present invention.

The parallel processing unit 400 according to an embodiment of the present invention may include the plurality of virtual machines 410. The parallel processing unit 400 according to this embodiment of the present invention further includes the plurality of protocol analysis units 430. Each of the protocol analysis units 430 may operate based on each of the virtual machines 410. Each protocol analysis unit 430 that operates based on each virtual machine 410 generates metadata or extracts content. The protocol analysis units 430 operate independently.

Figure 5:
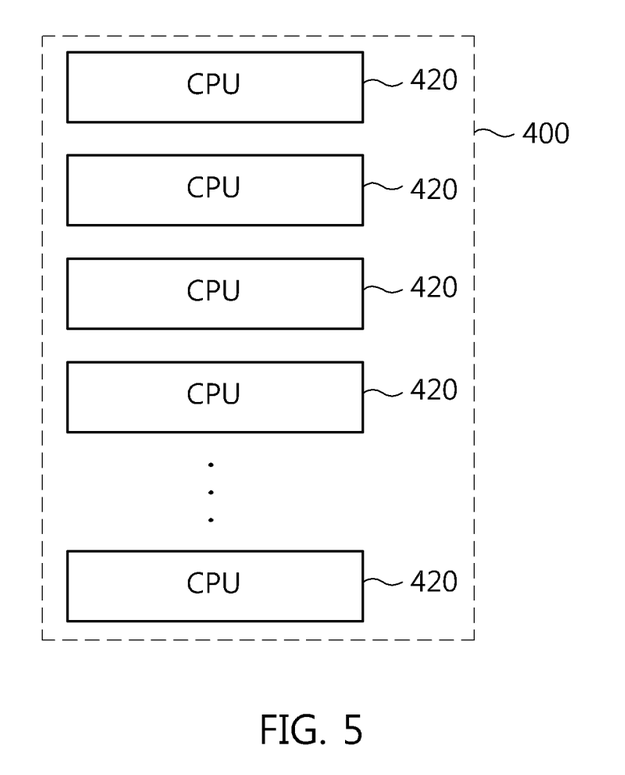
FIG. 5 is a block diagram illustrating a parallel processing unit according to another embodiment of the present invention.

FIG. 5 is a block diagram illustrating the parallel processing unit 400 according to another embodiment of the present invention.

The parallel processing unit 400 according to the other embodiment of the present invention may include the plurality of CPUs 420. That is, the parallel processing unit 400 according to this embodiment of the present invention may use a multi-core. Furthermore, the parallel processing unit 400 according to this embodiment of the present invention includes the plurality of protocol analysis units 430. Each of the protocol analysis units 430 operates based on each of the CPUs 420. Each protocol analysis unit 430 that operates based on each CPU 420 generates metadata or extracts content. The protocol analysis units 430 operate independently.

The apparatus 100 for processing packets according to an embodiment of the present invention processes a packet group in parallel in terms of hardware using the CPUs 420 or the virtual machines 430.

The protocol analysis unit 430 according to an embodiment of the present invention is described below with reference to FIG. 6.

Figure 6:
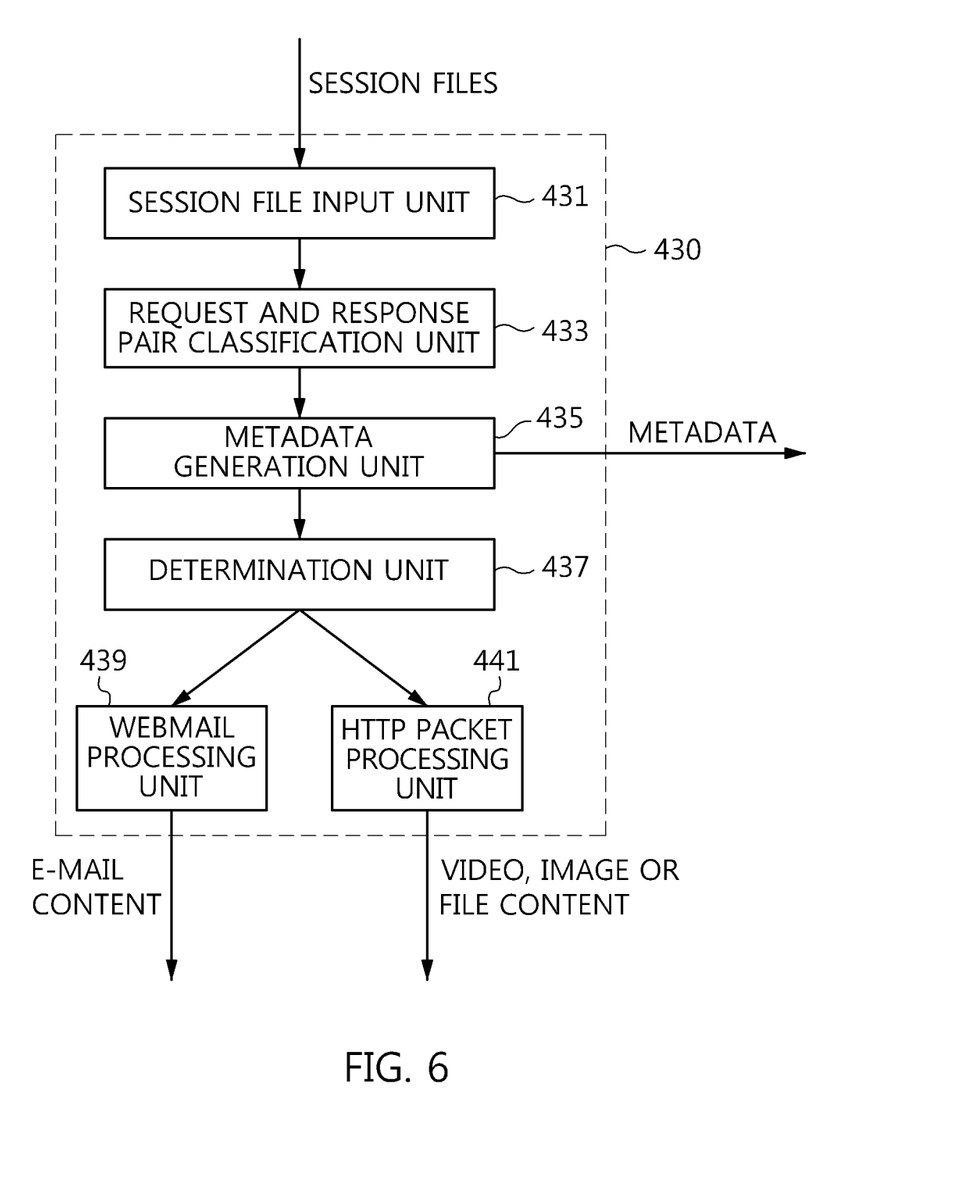
FIG. 6 is a block diagram illustrating a protocol analysis unit according to an embodiment of the present invention.

FIG. 6 is a block diagram illustrating the protocol analysis unit according to this embodiment of the present invention.

The protocol analysis unit 430 according to this embodiment of the present invention includes a session file input unit 431, a request and response pair classification unit 433, a metadata generation unit 435, a determination unit 437, a webmail processing unit 439, and an HTTP packet processing unit 441. Since the components of FIG. 6 are not essential, the protocol analysis unit 430 may be implemented to include components more than or fewer than the components of FIG. 6.

The session file input unit 431 receives session files distributed by the session distribution unit 320.

The request and response pair classification unit 433 classifies the received session files into HTTP request and response pairs. Each of the HTTP request and response pairs includes an HTTP request packet and an HTTP response packet.

The metadata generation unit 435 generates metadata from each of the HTTP request and response pairs based on information about an URL, an IP address, or a domain.

The determination unit 437 determines whether an HTTP request and response pair corresponds to a common HTTP message or a webmail. The common HTTP message according to an embodiment of the present invention may be an HTTP message, other than a webmail.

If an HTTP request and response pair corresponds to a webmail, the webmail processing unit 439 analyzes the mail protocol of the HTTP response packet or HTTP request packet of the HTTP request and response pair, and extracts e-mail content. The e-mail content according to an embodiment of the present invention may include information about the sender, recipient, or content of an e-mail. The apparatus 100 for processing packets according to an embodiment of the present invention separately processes the case where an HTTP request and response pair corresponds to a webmail. Furthermore, the webmail processing unit 439 according to an embodiment of the present invention may extract e-mail content from an HTTP request and response pair, and may separately store the extracted e-mail content. The webmail processing unit 439 may extract e-mail content based on a specific format because the e-mail content may have the specific format unlike other content. Furthermore, in accordance with an embodiment of the present invention, e-mail content may be separately stored or used because it is extracted separately from other content.

If an HTTP request and response pair corresponds to a common HTTP message, the HTTP packet processing unit 441 extracts content related to a video, an image or a specific file based on the HTTP response packet of the HTTP request and response pair.

A method of processing packets according to an embodiment of the present invention is described below with reference to FIG. 7.

Figure 7:
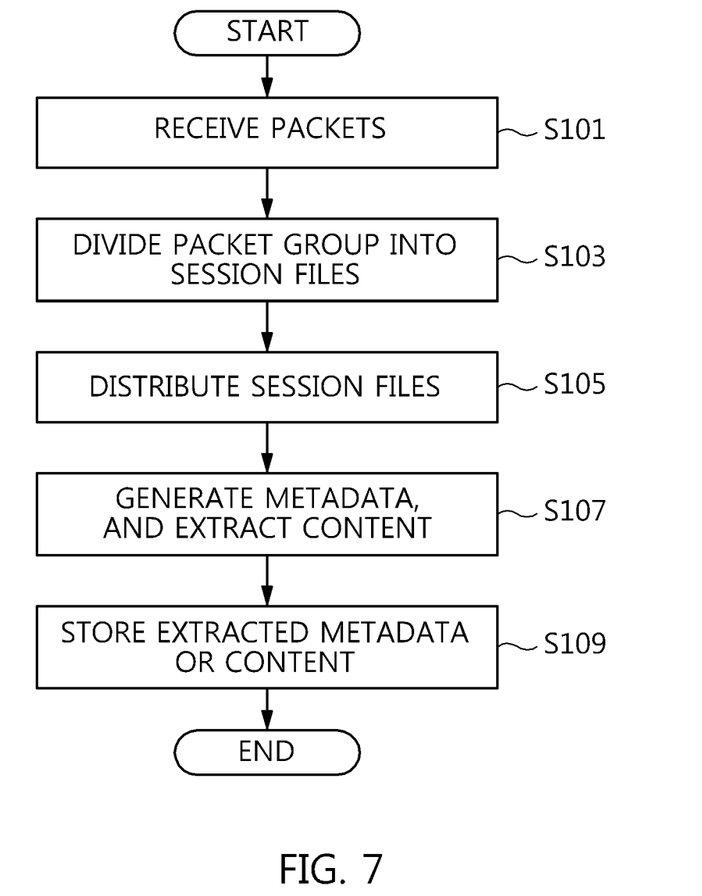
FIG. 7 is a flowchart illustrating a method of processing packets according to an embodiment of the present invention.

FIG. 7 is a flowchart illustrating the method of processing packets according to this embodiment of the present invention.

The input unit 200 receives a plurality of packets and forms a packet group at step S101. The size of the packet group according to an embodiment of the present invention may be equal to or larger than 10 Gigabytes. The input unit 200 according to an embodiment of the present invention may receive a plurality of HTTP packets and form a packet group.

The session division unit 310 divides the received packet group into session files at step S103.

The session distribution unit 320 distributes the session files at step S105. The session distribution unit 320 distributes the session files to the virtual machines 410 or CPUs 420 of the parallel processing unit 400.

The parallel processing unit 400 generates metadata and extracts content from each of the session files at step S107. Each of the protocol analysis unit 430 that operates based on each of the plurality of virtual machines 410 or plurality of CPUs 420 of the parallel processing unit 400 generates metadata and extracts content from each of the session files.

The metadata storage unit 510 stores the extracted metadata and the content storage unit 520 stores the extracted content at step S109. The storage unit 500 according to an embodiment of the present invention stores the metadata generated by the parallel processing unit 400 or the content extracted by the parallel processing unit 400.

As described above, the apparatus for processing packets according to an embodiment of the present invention can rapidly process a large-sized packet group because each of the protocol analysis units independently extracts content or generates metadata based on each of session files into which the packet group has been divided.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for processing packets, comprising:
a session processing unit configured to divide a packet group into a plurality of session files, and to distribute the session files, the packet group including a plurality of HTTP (Hypertext Transfer Protocol) packets;
a processing unit comprising a plurality of virtual machines or a plurality of central processing units (CPUs) configured to process the distributed session files in parallel and to independently generate metadata and to independently extract content from each of distributed session files, the independently generated metadata and extracted content being performed according to at least one of the following process by the processing unit:
to classify the session files into HTTP request and response pairs, the pairs including an HTTP request packet and an HTTP response packet,
to generate metadata based on information corresponding to a URL, IP address or domain of each of the HTTP request and response pairs,
to analyze a mail protocol of the HTTP response packet or HTTP request packet,
to extract e-mail content if the HTTP request and response pair corresponds to a webmail,
to extract content related to a video, an image, or a specific file based on the HTTP, and response packet if the HTTP request and response pair corresponds to a common HTTP message, not a webmail; and
a non-transitory storage unit configured to store the generated metadata and the extracted content which being independently processed at the processing unit in parallel.

2. The apparatus of claim 1, wherein the parallel processing unit comprises:
a plurality of protocol analysis units; and
each of the protocol analysis units independently generate the metadata and extract the content from each of the session files.

3. An apparatus comprising:
a session processing unit configured to divide a packet group into a plurality of session files, and to distribute the session files, the packet group including a plurality of HTTP (Hypertext Transfer Protocol) packets;
a parallel processing unit including a plurality of protocol analysis units which comprising a plurality of virtual machine or a plurality of central processing units (CPU) configured to process the distributed session files in parallel and to generate metadata and to extract content from each of distributed session files, each of the protocol analysis units independently generate the metadata and extract the content from each of the session files; and
a storage unit configured to store the generated metadata and the extracted content which being independently processed at the parallel processing unit in parallel, and each of the protocol analysis units further comprising,
a request and response pair classification unit configured to classify the session files into HTTP request and response pairs, the pairs including an HTTP request packet and an HTTP response packet;
a metadata generation unit configured to generate metadata based on information corresponding to a Uniform Resource Locator (URL), Internet Protocol (IP) address, or domain of each of the HTTP request and response pairs;
a webmail processing unit configured to analyze a mail protocol of the HTTP response packet or the HTTP request packet, and to extract e-mail content if the HTTP request and response pair corresponds to a webmail; and an HTTP packet processing unit configured to extract content related to a video, an image or a specific file based on the HTTP response packet if the HTTP request and response pair corresponds to a common HTTP message, not a webmail.

4. The apparatus of claim 3, wherein the e-mail content comprises information corresponding to a sender, recipient or content of an e-mail.

5. The apparatus of claim 2, wherein each of the protocol analysis units is configured to operate based on each of the virtual machines.

6. The apparatus of claim 2, wherein each of the protocol analysis units is configured to operate based on each of the CPUs.

7. The apparatus of claim 3, wherein the storage unit comprises:
a metadata storage unit configured to store the metadata generated by the metadata generation unit; and
a content storage unit configured to store the e-mail content extracted by the webmail processing unit or the content related to a video, an image or a specific file extracted by the HTTP packet processing unit.

8. The apparatus of claim 1, wherein the session processing unit comprises:
a session division unit configured to divide the packet group into the session files based on packets having identical session information about a source IP address, a destination IP address, a source port and a destination port; and
a session distribution unit configured to distribute the session files to the parallel processing unit.

9. The apparatus of claim 1, wherein the packet group has a size equal to or larger than 10 gigabytes.

10. The apparatus of claim 1, further comprising:
an output unit configured to display the metadata, the content, results of the extraction of the metadata, or results of the extraction of the content on a screen.

11. A computer implemented method of processing packets, comprising:
dividing a packet group including a plurality of HTTP packets into a plurality of session files, and distributing the session files;
processing, by virtual machines, the distributed session files in parallel and independently generating metadata and extracting content from each of distributed session files; and
storing the generated metadata and the extracted content which being processed in parallel, the independently generating metadata and extracting content from each of distributed session files further comprising at least one of the following steps:
generating the metadata and extracting content from each of distributed session files further comprises,
classifying the session files into HTTP request and response pairs, the pairs including an HTTP request packet and an HTTP response packet,
generating metadata based on information corresponding to a URL, IP address or domain of each of the HTTP request and response pairs,
analyzing a mail protocol of the HTTP response packet or HTTP request packet,
extracting e-mail content if the HTTP request and response pair corresponds to a webmail, and
extracting content related to a video, an image, or a specific file based on the HTTP response packet if the HTTP request and response pair corresponds to a common HTTP message, not a webmail.

12. The method of claim 11, further comprising:
independently generating the meta data and independently extracting the content from each of the session files based on the plurality of session files.

13. A method comprising:
dividing a packet group including a plurality of HTTP packets into a plurality of session files, and distributing the session files;
processing, by virtual machines, the distributed session files in parallel and generating metadata and extracting content from each of distributed session files, the meta data being independently generated and the content being independently extracted from each of the session files based on the plurality of session files; and
storing the generated metadata generated and the extracted content which being processed in parallel, wherein
generating the metadata and extracting content from each of distributed session files further comprises,
classifying the session files into HTTP request and response pairs, the pairs including an HTTP request packet and an HTTP response packet;
generating metadata based on information corresponding to a URL, IP address or domain of each of the HTTP request and response pairs;
analyzing a mail protocol of the HTTP response packet or HTTP request packet, and
extracting e-mail content if the HTTP request and response pair corresponds to a webmail; and
extracting content related to a video, an image, or a specific file based on the HTTP response packet if the HTTP request and response pair corresponds to a common HTTP message, not a webmail.

14. The method of claim 13, wherein the e-mail content comprises information corresponding to a sender, recipient or content of an e-mail.

15. The method of claim 12, wherein processing the distributed session files in parallel based on a plurality of virtual machine or a plurality of central processing units (CPUs) configured in parallel.

16. The method of claim 13, further comprising:
storing the generated metadata and storing the extracted e-mail content or the content related to a extracted video, an image or a specific file.

17. The method of claim 11, further comprising:
dividing the packet group into the session files based on packets having identical session information corresponding a source IP address, a destination IP address, a source port and a destination port, and distributing the session files.

18. The method of claim 11, wherein the packet group has a size equal to or larger than 10 gigabytes.

19. The method of claim 11, further comprising:
displaying the metadata, the content, results of the extraction of the metadata, or results of the extraction of the content on a screen.

* * * * *